United States Patent
Wang et al.

(10) Patent No.: US 10,063,655 B2
(45) Date of Patent: Aug. 28, 2018

(54) INFORMATION PROCESSING METHOD, TRUSTED SERVER, AND CLOUD SERVER

(71) Applicant: Huawei Device (Dongguan) Co., Ltd., Dongguan (CN)

(72) Inventors: Chan Wang, Shenzhen (CN); Huangwei Wu, Shenzhen (CN)

(73) Assignee: HUAWEI DEVICE (DONGGUAN) CO., LTD., Dongguan (CN)

(*) Notice: Subject to any disclaimer, the term of this patent is extended or adjusted under 35 U.S.C. 154(b) by 268 days.

(21) Appl. No.: 14/820,673

(22) Filed: Aug. 7, 2015

(65) Prior Publication Data

US 2015/0350375 A1    Dec. 3, 2015

Related U.S. Application Data (63) Continuation of application No. PCT/CN2014/073886, filed on Mar. 21, 2014.

(30) Foreign Application Priority Data

Mar. 21, 2013 (CN) .......................... 2013 1 0092589

(51) Int. Cl.
    *H04L 29/08*    (2006.01)
    *H04L 29/06*    (2006.01)

(52) U.S. Cl.
    CPC .......... *H04L 67/32* (2013.01); *H04L 63/0428* (2013.01); *H04L 63/061* (2013.01);
(Continued)

(58) Field of Classification Search
    CPC ..... H04L 29/06; H04L 63/08; H04L 63/0428; H04L 67/32; H04L 63/061; H04L 63/062;
(Continued)

(56) References Cited

U.S. PATENT DOCUMENTS 7,146,505 B1 * 12/2006 Harada ................ G06Q 20/206
    713/185
2001/0036224 A1 * 11/2001 Demello ................ H04L 63/30
    375/220

(Continued)

FOREIGN PATENT DOCUMENTS

CN      101569130 A    10/2009
CN      101834861 A      9/2010

(Continued)

OTHER PUBLICATIONS

Felt et al, Privacy Protection for Social Networking Platforms, 2008.*

(Continued)

*Primary Examiner* — Hadi S Armouche
*Assistant Examiner* — Huan V Doan
(74) *Attorney, Agent, or Firm* — Conley Rose, P.C.

(57) ABSTRACT

An information processing method, a trusted server, and a cloud server. The method includes acquiring user data of a user terminal, extracting summary information of the user data, where the summary information includes privacy information and non-privacy information of a user, generating a unique identifier (UID) for the privacy information, and transmitting the non-privacy information and the UID to a cloud server, so that the cloud server saves a correspondence between the non-privacy information and the UID.

3 Claims, 7 Drawing Sheets

(52) U.S. Cl.
CPC .............. *H04L 63/10* (2013.01); *H04L 67/02* (2013.01); *H04L 67/1097* (2013.01)

(58) Field of Classification Search
CPC ..... H04L 63/065; H04L 63/10; H04L 63/126; H04L 67/28; H04L 67/2804; H04L 67/2823; H04L 67/2842; H04L 67/2852; H04L 67/2857; H04L 67/288; H04L 67/306; H04L 2209/04; H04L 2209/16; H04L 2209/42; G06Q 30/02; G06Q 30/0251; G06Q 30/0261; G06Q 30/0269; G06Q 30/0271; G06Q 30/0613; G06Q 30/0615; G06Q 30/0617; G06Q 50/01; H04W 12/02

See application file for complete search history.

(56) References Cited

U.S. PATENT DOCUMENTS

| | | | | |
|---|---|---|---|---|
| 2002/0019764 | A1* | 2/2002 | Mascarenhas | G06Q 30/02 707/792 |
| 2002/0035605 | A1 | 3/2002 | McDowell et al. | |
| 2002/0049968 | A1* | 4/2002 | Wilson | H04H 20/103 725/35 |
| 2006/0075228 | A1* | 4/2006 | Black | H04L 63/0428 713/167 |
| 2007/0250704 | A1 | 10/2007 | Hallam-Baker et al. | |
| 2008/0196098 | A1* | 8/2008 | Cottrell | H04L 63/0414 726/12 |
| 2008/0209216 | A1* | 8/2008 | Kelly | H04L 63/0869 713/169 |
| 2008/0263645 | A1 | 10/2008 | Renter et al. | |
| 2009/0254971 | A1* | 10/2009 | Herz | G06Q 10/10 726/1 |
| 2011/0060905 | A1* | 3/2011 | Stack | G06Q 10/10 713/167 |
| 2011/0078775 | A1* | 3/2011 | Yan | G06F 21/57 726/6 |
| 2012/0042162 | A1* | 2/2012 | Anglin | G06F 21/57 713/165 |
| 2012/0131075 | A1 | 5/2012 | Mawdsley et al. | |
| 2012/0297184 | A1 | 11/2012 | Greer et al. | |
| 2013/0080767 | A1* | 3/2013 | Francis | H04M 3/4878 713/154 |
| 2013/0124628 | A1* | 5/2013 | Weerasinghe | G06Q 30/0241 709/204 |
| 2013/0305383 | A1* | 11/2013 | Garralda | G06Q 30/00 726/26 |

FOREIGN PATENT DOCUMENTS

| | | |
|---|---|---|
| CN | 102611711 A | 7/2012 |
| CN | 102655508 A | 9/2012 |
| CN | 102857338 A | 1/2013 |
| CN | 102916948 A | 2/2013 |

OTHER PUBLICATIONS

Juels, Targeted Advertising . . . And Privacy Too, 17 pages (Year: 2001).*
Albeshri et al., Mutual Protection in a Cloud Computing Environment, IEEE, 6 pages (Year: 2010).*
Foreign Communication Form A Counterpart Application, Chinese Application No. 201310092589.8, Chinese Office Action dated Sep. 29, 2016, 7 pages.
Partial English Translation and Abstract of Chinese Patent Application No. CN102611711, Oct. 26, 2015, 3 pages.
Foreign Communication From a Counterpart Application, PCT Application No. PCT/CN2014/073886, English Translation of International Search Report dated Jun. 30, 2014, 2 pages.
Foreign Communication From a Counterpart Application, PCT Application No. PCT/CN2014/073886, English Translation of Written Opinion dated Jun. 30, 2014, 10 pages.
Foreign Communication From a Counterpart Application, European Application No. 14771033.9, Extended European Search Report dated Feb. 3, 2016, 9 pages.

* cited by examiner

INFORMATION PROCESSING METHOD, TRUSTED SERVER, AND CLOUD SERVER

CROSS-REFERENCE TO RELATED APPLICATIONS

This application is a continuation of International Application No. PCT/CN2014/073886, filed on Mar. 21, 2014, which claims priority to Chinese Patent Application No. 201310092589.8, filed on Mar. 21, 2013, both of which are hereby incorporated by reference in their entireties.

TECHNICAL FIELD

The present disclosure relates to the field of network communications technologies, and in particular, to an information processing method, a trusted server, and a cloud server.

BACKGROUND

Cloud computing is a technology in which dynamically scalable and virtualized resources are provided over the internet. By using cloud computing, a network can be conveniently accessed, and storage and management of massive data can be implemented by configuring a large number of storage devices. In cloud computing, a great number of users need to be involved, and to protect security of user data, a user generally encrypts user data to be uploaded to a cloud server.

However, when uploading encrypted user data to the cloud server, the user also uploads summary information of the user data at the same time, where the summary information is a brief summary of user data, and is information that describes the user data in a concise form by extracting key information from the user data; and the summary information may include a name, a phone number, an e-mail address, information that interests the user, and so on. Due to openness of the summary information, a third party may obtain, from the cloud server, summary information of a user in which the third party is interested. As a result, personal privacy information of the user is leaked, and security performance of a cloud computing system is reduced.

SUMMARY

Embodiments of the present disclosure provide an information processing method, a trusted server, and a cloud server, so as to solve a problem that security performance is low because user privacy information is prone to be leaked on a cloud server.

To solve the foregoing technical problem, the embodiments of the present disclosure disclose the following technical solutions According to a first aspect, an information processing method is provided, and the method includes acquiring user data of a user terminal, extracting summary information of the user data, where the summary information includes privacy information and non-privacy information of a user, generating a unique identifier (UID) for the privacy information, and transmitting the non-privacy information and the UID to a cloud server, so that the cloud server saves a correspondence between the non-privacy information and the UID.

With reference to the first aspect, in a first possible implementation manner of the first aspect, after the extracting summary information of the user data, the method further includes: saving a correspondence between the privacy information and the UID.

With reference to the first aspect or the first possible implementation manner of the first aspect, in a second possible implementation manner of the first aspect, the acquiring user data of a user terminal is receiving a notification message sent by the user terminal, where the notification message is used to notify that encrypted user data has been uploaded to the cloud server by the user terminal, and the encrypted user data is data obtained by the user terminal after encrypting the user data according to a delivered encryption key, sending, to the cloud server according to the notification message, a data request message that is used to request for the encrypted user data, receiving the encrypted user data that is returned by the cloud server according to the data request message, and decrypting the encrypted user data by using the encryption key, to obtain decrypted user data.

With reference to the second possible implementation manner of the first aspect, in a third possible implementation manner of the first aspect, before the receiving a notification message sent by the user terminal, the method further includes receiving a key request message sent by the user terminal, and delivering the encryption key to the user terminal according to the key request message, so that the user terminal transmits the encrypted user data to the cloud server after encrypting the user data according to the encryption key.

With reference to the first aspect or the first possible implementation manner of the first aspect, in a fourth possible implementation manner of the first aspect, the acquiring user data of a user terminal is: receiving the user data, which is uploaded by the user terminal, of the user terminal, and the method further includes encrypting the user data by using a encryption key agreed with the user terminal, and transmitting encrypted user data to the cloud server.

With reference to the first possible implementation manner of the first aspect, in a fifth possible implementation manner of the first aspect, the method further includes receiving push information and a UID that are sent by a third party terminal, where the UID is a UID that is obtained and sent to the third party terminal by the cloud server after receiving requirement information sent by the third party terminal, and that is corresponding to non-privacy information matching the requirement information, obtaining privacy information corresponding to the UID, and sending the push information according to user address information included in the privacy information.

According to a second aspect, another information processing method is provided, and the method includes receiving non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server, and saving a correspondence between the non-privacy information and the UID.

With reference to the second aspect, in a first possible implementation manner of the second aspect, the method further includes receiving requirement information sent by a third party terminal, matching the saved non-privacy information to the requirement information, to obtain a UID corresponding to non-privacy information that matches the requirement information, and sending the obtained UID corresponding to the non-privacy information to the third party terminal, so that, after the third party terminal sends the UID and push information to the trusted server, the trusted server sends the push information according to user address information included in privacy information corresponding to the UID.

According to a third aspect, a trusted server is provided, and the trusted server includes an acquiring unit configured to acquire user data of a user terminal, an extracting unit configured to extract summary information of the user data acquired by the acquiring unit, where the summary information includes privacy information and non-privacy information of a user, a generating unit configured to generate a UID for the privacy information in the summary information extracted by the extracting unit, and a transmitting unit configured to transmit, to a cloud server, the non-privacy information in the summary information extracted by the extracting unit and the UID generated by the generating unit, so that the cloud server saves a correspondence between the non-privacy information and the UID.

With reference to the third aspect, in a first possible implementation manner of the third aspect, the trusted server further includes a saving unit configured to save a correspondence between the privacy information in the summary information extracted by the extracting unit and the UID generated by the generating unit.

With reference to the third aspect or the first possible implementation manner of the third aspect, in a second possible implementation manner of the third aspect, the acquiring unit includes a notification message receiving sub-unit configured to receive a notification message sent by the user terminal, where the notification message is used to notify that encrypted user data has been uploaded to the cloud server by the user terminal, and the encrypted user data is data obtained by the user terminal after encrypting the user data according to a delivered encryption key, a data request sending sub-unit configured to send, to the cloud server according to the notification message received by the notification message receiving sub-unit, a data request message that is used to request for the encrypted user data, an encrypted data receiving sub-unit configured to receive the encrypted user data that is returned by the cloud server according to the data request message sent by the request message sending sub-unit, and an encrypted data decrypting sub-unit configured to decrypt, by using the encryption key, the encrypted user data received by the encrypted data receiving sub-unit, to obtain decrypted user data.

With reference to the second possible implementation manner of the third aspect, in a third possible implementation manner of the third aspect, the trusted server further includes a first receiving unit configured to receive a key request message sent by the user terminal, and a delivering unit configured to deliver the encryption key to the user terminal according to the key request message received by the first receiving unit, so that the user terminal transmits the encrypted user data to the cloud server after encrypting the user data according to the encryption key.

With reference to the third aspect or the first possible implementation manner of the third aspect, in a fourth possible implementation manner of the third aspect, the acquiring unit includes a user data receiving sub-unit configured to receive the user data, which is uploaded by the user terminal, of the user terminal, and the trusted server further includes an encrypting unit configured to encrypt, by using a encryption key agreed with the user terminal, the user data received by the user data receiving sub-unit, where the transmitting unit is further configured to transmit, to the cloud server, encrypted user data that is output by the encrypting unit.

With reference to the first possible implementation manner of the third aspect, in a fifth possible implementation manner of the third aspect, the trusted server further includes a second receiving unit configured to receive push information and a UID that are sent by a third party terminal, where the UID is a UID that is obtained and sent to the third party terminal by the cloud server after receiving requirement information sent by the third party terminal, and that is corresponding to non-privacy information matching the requirement information, an obtaining unit configured to obtain privacy information corresponding to the UID received by the second receiving unit, and a sending unit configured to send the push information according to user address information included in the privacy information acquired by the obtaining unit.

According to a fourth aspect, another trusted server is provided, and the trusted server includes: a bus, a processor, and a network interface, where the processor and the network interface are connected by using the bus, where the processor is configured to acquire user data of a user terminal by using the network interface, extract summary information of the user data, where the summary information includes privacy information and non-privacy information of a user, generate a UID for the privacy information, and transmit the non-privacy information and the UID to a cloud server by using the network interface, so that the cloud server saves a correspondence between the non-privacy information and the UID.

With reference to the fourth aspect, in a first possible implementation manner of the fourth aspect, the trusted server further includes: a memory connected to the bus, where the memory is configured to save a correspondence between the privacy information and the UID.

With reference to the fourth aspect or the first possible implementation manner of the fourth aspect, in a second possible implementation manner of the fourth aspect, the processor is further configured to receive, by using the network interface, push information and a UID that are sent by a third party terminal, where the UID is a UID that is obtained and sent to the third party terminal by the cloud server after receiving requirement information sent by the third party terminal, and that is corresponding to non-privacy information matching the requirement information; obtain privacy information corresponding to the UID; and send the push information to the user by using the network interface according to user address information included in the privacy information.

According to a fifth aspect, a cloud server is provided, and the cloud server includes a first receiving unit configured to receive non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server, and a saving unit configured to save a correspondence between the non-privacy information and the UID that are received by the first receiving unit.

With reference to the fifth aspect, in a first possible implementation manner of the fifth aspect, the cloud server further includes a second receiving unit configured to receive requirement information sent by a third party terminal, a matching unit configured to match the non-privacy information saved by the saving unit to the requirement information received by the second receiving unit, to obtain a UID corresponding to non-privacy information that matches the requirement information, and a sending unit configured to send the UID that is corresponding to the non-privacy information and obtained by the matching unit to the third party terminal, so that, after the third party terminal sends the UID and push information to the trusted server, the trusted server sends the push information according to user address information included in privacy information corresponding to the UID.

According to a sixth aspect, another cloud server is provided, and the cloud server includes: a bus, a processor, a network interface, and a memory, where the processor, the network interface, and the memory are connected by using the bus, where the processor is configured to receive, by using the network interface, non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server; and save a correspondence between the non-privacy information and the UID into the memory.

With reference to the sixth aspect, in a first possible implementation manner of the sixth aspect, the processor is further configured to receive, by using the network interface, requirement information sent by a third party terminal, match the non-privacy information saved by the memory to the requirement information, to obtain a UID corresponding to non-privacy information that matches the requirement information, and send the obtained UID corresponding to the non-privacy information to the third party terminal by using the network interface, so that, after the third party terminal sends the UID and push information to the trusted server, the trusted server sends the push information according to user address information included in privacy information corresponding to the UID.

In the embodiments provided by the present disclosure, a trusted server acquires user data of a user terminal, extracts summary information of the user data, where the summary information includes privacy information and non-privacy information of a user, generates a UID for the privacy information, and transmits the non-privacy information and the UID to a cloud server, and the cloud server saves a correspondence between the non-privacy information and the UID. Because a trusted server is introduced in the embodiments provided by the present disclosure, after the summary information of the user is processed by the trusted server, the cloud server no longer saves complete summary information formed by the privacy information and the non-privacy information, but saves only the non-privacy information in the summary information and the UID of the privacy information in the summary information, so that a third party cannot acquire the privacy information of the user from the cloud server, thereby improving security performance of a cloud computing system.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, a person of ordinary skill in the art may still derive other drawings from these accompanying drawings without creative efforts.

DESCRIPTION OF EMBODIMENTS

The following embodiments of the present disclosure provide an information processing method, a trusted server, and a cloud server.

To make a person skilled in the art understand the technical solutions in the embodiments of the present disclosure better, and make the foregoing objectives, features, and advantages of the embodiments of the present disclosure clearer, the following further describes the technical solutions in the embodiments of the present disclosure with reference to the accompanying drawings.

Figure 1:
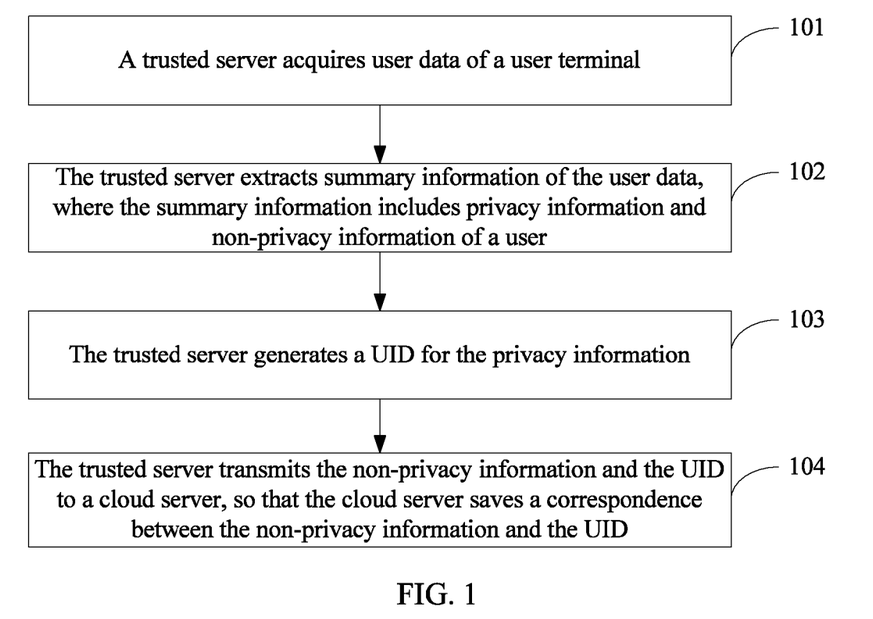
FIG. 1 is a flowchart of an embodiment of an information processing method according to the present disclosure.

Referring to FIG. 1, FIG. 1 is a flowchart of an embodiment of an information processing method according to the present disclosure. The embodiment describes an information processing process in cloud computing from a perspective of a trusted server.

Step 101: A trusted server acquires user data of a user terminal.

In this embodiment of the present disclosure, the trusted server may be a server in a trust center. The trust center is deployed between a cloud server and a terminal, and may issue certificates in advance to the cloud server, the user terminal, and a third party terminal that perform information interaction by using the trusted server, so as to implement identity authentication between the cloud server, the user terminal, and the third party terminal, that is, the trust center may have a certificate authority (CA) center. In addition, the trust center may further deliver a key to the user terminal, that is, the trust center may have a key distribution center (KDC).

In the embodiment, the trusted server may receive the user data directly uploaded by the user terminal. Alternatively, the trusted server may also receive a notification message sent by the user terminal, and then send, to the cloud server according to the notification message, a data request message that is used to request for encrypted user data, where the notification message is used to notify the trusted server that the encrypted user data has been uploaded to the cloud server by the user terminal, and the encrypted user data is data obtained by the user terminal after encrypting the user data according to a encryption key delivered by the trusted server; and the trusted server receives the encrypted user data that is returned by the cloud server according to the data request message, and decrypts the encrypted user data by using the encryption key, to obtain decrypted user data.

Step 102: The trusted server extracts summary information of the user data, where the summary information includes privacy information and non-privacy information of a user.

In this embodiment of the present disclosure, the summary information refers to a brief summary of user data, and is information that describes the user data in a concise form by extracting key information from the user data. The summary information may include two parts, namely, privacy information and non-privacy information, where the privacy information refers to some personal sensitive information with a confidential property, and the non-privacy information may include information that interests the user, and the like. For example, for medical data of the user, privacy information of the medical data may include a name, a phone number, a home address, an E-Mail, account information of the user, and the like; and the non-privacy information of the medical data may include information of a hospital that the user visits, medicine information, family medical history information, and the like.

In this embodiment of the present disclosure, a crawler technology or an automatic abstracting technology in the prior art may be used to extract the summary information from the user data, and details are not described herein again.

Step 103: The trusted server generates a UID for the privacy information.

In this embodiment, each user may have a user identity representing identity, and each user may have multiple copies of user data. In order to distinguish privacy information in summary information of each piece of user data, the trusted server generates a UID for each piece of privacy information. The UID may be a sequence number generated by the trusted server in sequence, or may be a sequence number generated by the trusted server by using a preset function to perform calculation on the data. That is, each piece of privacy information corresponds to a unique sequence number.

Step 104: The trusted server transmits the non-privacy information and the UID to a cloud server, so that the cloud server saves a correspondence between the non-privacy information and the UID.

In this embodiment, the trusted server transmits, to the cloud server, the non-privacy information in the summary information and the UID generated for the privacy information. Because the cloud server merely saves the non-privacy information of the user, a third party cannot obtain the privacy information of the user from the cloud server.

It can be seen from the foregoing embodiment that, after summary information of a user is processed by a trusted server, a cloud server no longer saves complete summary information formed by privacy information and non-privacy information, but saves only the non-privacy information in the summary information and a UID of the privacy information in the summary information, so that a third party cannot acquire the privacy information of the user from the cloud server, thereby improving security performance of a cloud computing system.

Figure 2:
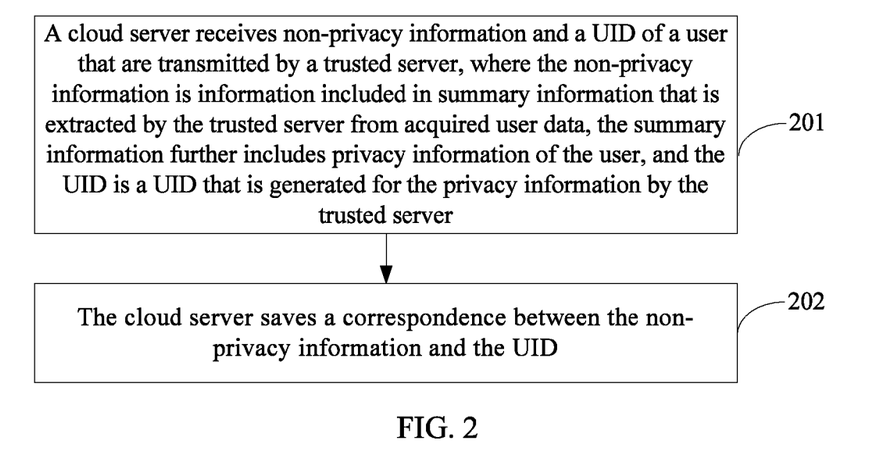
FIG. 2 is a flowchart of another embodiment of an information processing method according to the present disclosure.

Referring to FIG. 2, FIG. 2 is a flowchart of another embodiment of an information processing method according to the present disclosure. The embodiment describes an information processing process in cloud computing from a perspective of a cloud server.

Step 201: A cloud server receives non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server.

In this embodiment of the present disclosure, the cloud server may be a server that is set in a cloud computing system, the server has a function of storing massive user data, and a user terminal may access the cloud server via a network. From the embodiment described from the perspective of the trusted server in FIG. 1, it can be seen that, after acquiring the user data of the user terminal, the trusted server extracts the summary information of the user data, where the summary information includes the privacy information and the non-privacy information of the user; and after generating the UID for the privacy information, the trusted server transmits the non-privacy information and the UID to the cloud server. Therefore, the cloud server may obtain only the non-privacy information of the user, so that a third party cannot obtain the privacy information of the user from the cloud server.

Step 202: The cloud server saves a correspondence between the non-privacy information and the UID.

It can be seen from the foregoing embodiment that, after summary information of a user is processed by a trusted server, a cloud server saves only non-privacy information in the summary information, so that a third party cannot acquire privacy information of the user from the cloud server, thereby improving security performance of a cloud computing system.

Figure 3:
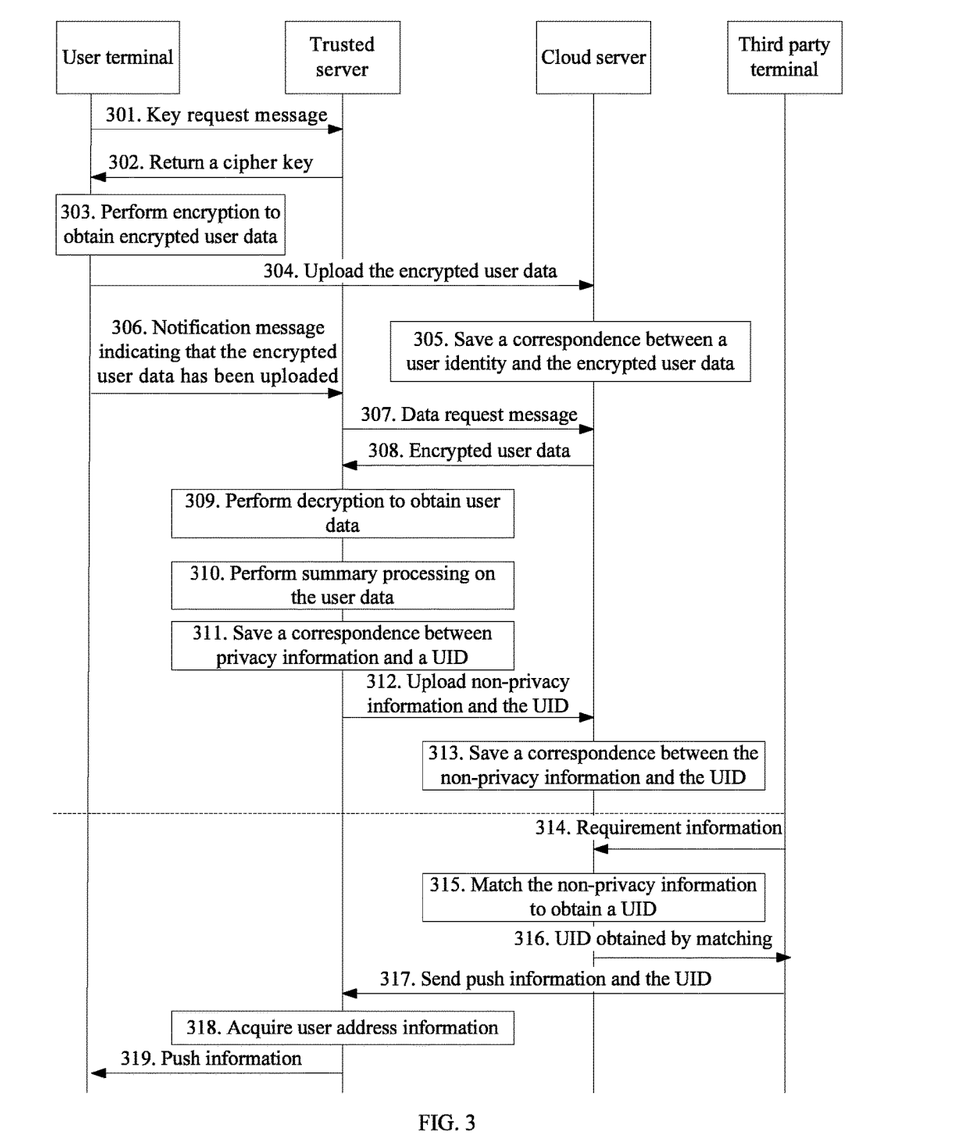
FIG. 3 is a flowchart of another embodiment of an information processing method according to the present disclosure.

Referring to FIG. 3, FIG. 3 is a flowchart of another embodiment of an information processing method according to the present disclosure. In this embodiment, a detailed information processing process is described by using interaction between a user terminal, a trusted server, a cloud server, and a third party terminal.

Step 301: A user terminal sends a key request message to a trusted server.

In this embodiment of the present disclosure, the trusted server may be a server in a trust center. The trust center is deployed between a cloud server and a terminal, and may issue certificates in advance to the cloud server, the user terminal, and a third party terminal that perform information interaction by using the trusted server, so as to implement identity authentication between the cloud server, the user terminal, and the third party terminal, that is, the trust center may have a CA. In addition, the trust center may further deliver a key to the user terminal, that is, the trust center may have a KDC.

In order to protect privacy of user data, the user terminal may send the key request message including a user identity to the trusted server before uploading the user data to the cloud server, where the key request message is used to request the trusted server to allocate a encryption key.

Step 302: The trusted server returns an encryption key to the user terminal according to the key request message, and saves a correspondence between a user identity and the encryption key.

Step 303: The user terminal encrypts, by using the encryption key, user data to be uploaded to a cloud server, to obtain encrypted user data.

The cloud server is a device used for implementing mass storage of the user data. In order to ensure security of the user data saved on the cloud server, in this embodiment, the user terminal may encrypt the user data, and save the encrypted user data on the cloud server. Because it is difficult for a third party terminal to obtain the encryption key, the third party terminal cannot access the user data at will.

Step 304: The user terminal uploads the encrypted user data to the cloud server.

When the user terminal uploads the encrypted user data to the cloud server, the user identity is carried at the same time.

Step 305: The cloud server saves a correspondence between the user identity and the encrypted user data.

Step 306: The user terminal sends, to the trusted server, a notification message indicating that the encrypted user data has been uploaded to the cloud server.

Step 307: The trusted server sends, to the cloud server, a data request message that is used to request for the encrypted user data.

The trusted server carries the user identity in the sent data request message.

Step 308: The cloud server searches for the saved correspondence between the user identity and the encrypted user data according to the user identity, acquires encrypted user data corresponding to the user identity, and sends the acquired encrypted user data to the trusted server.

Step 309: The trusted server obtains, according to the user identity, the encryption key corresponding to the user identity, and decrypts, by using the encryption key, the encrypted user data that is received, to obtain the user data.

Step 310: The trusted server performs summary information processing on the user data, extracts summary information from the user data, removes privacy information from the summary information, and generates a UID for the privacy information.

Step 311: The trusted server saves a correspondence between the privacy information and the UID.

Step 312: The trusted server uploads non-privacy information and the UID generated for the privacy information to the cloud server.

Step 313: On a basis of the correspondence, between the user identity and the encrypted user data, saved in step 305 described above, the cloud server further saves a correspondence between the user identity, the non-privacy information, and the UID.

Step 314: A third party terminal sends requirement information to the cloud server.

The requirement information is information that is set by the third party terminal when the third party terminal wants to acquire, from the cloud server, information of a user that meets a specific condition. For example, if a travel company wants to acquire, from the cloud server, information of users who travel more than three times every year, and to push travel information to these users, "travelling more than three times" is a type of requirement information.

Step 315: The cloud server matches the requirement information to saved non-privacy information, to obtain a UID corresponding to non-privacy information that matches the requirement information.

The cloud server saves the correspondence between non-privacy information and the UID, and the cloud server may match the requirement information to saved non-privacy information one by one, to obtain non-privacy information that matches the requirement information, and then, the cloud server obtains, according to the correspondence, a UID corresponding to matched non-privacy information.

Step 316: The cloud server sends the obtained UID to the third party terminal.

Step 317: The third party terminal sends push information and the UID to the trusted server.

Step 318: The trusted server acquires privacy information corresponding to the UID sent by the third party terminal, and obtains user address information from the privacy information.

Because the trusted server saves the correspondence between the privacy information and the UID, after receiving the UID sent by the third party terminal, the trusted server may obtain, according to the correspondence, the privacy information corresponding to the UID, where the privacy information may usually include the user address information.

Step 319: The trusted server sends the push information to the user terminal according to the obtained address information.

Optionally, in the foregoing embodiment shown in FIG. 3, the user terminal may also upload the encrypted user data to the trusted server, so that the trusted server does not need to obtain the encrypted user data from the cloud server, which is not limited in the embodiment of the present disclosure.

It can be seen from the foregoing embodiment that, after summary information of a user is processed by a trusted server, a cloud server no longer saves complete summary information formed by privacy information and non-privacy information, but saves only the non-privacy information in the summary information and a UID of the privacy information in the summary information, so that a third party cannot acquire the privacy information of the user from the cloud server, thereby improving security performance of a cloud computing system.

Figure 4:
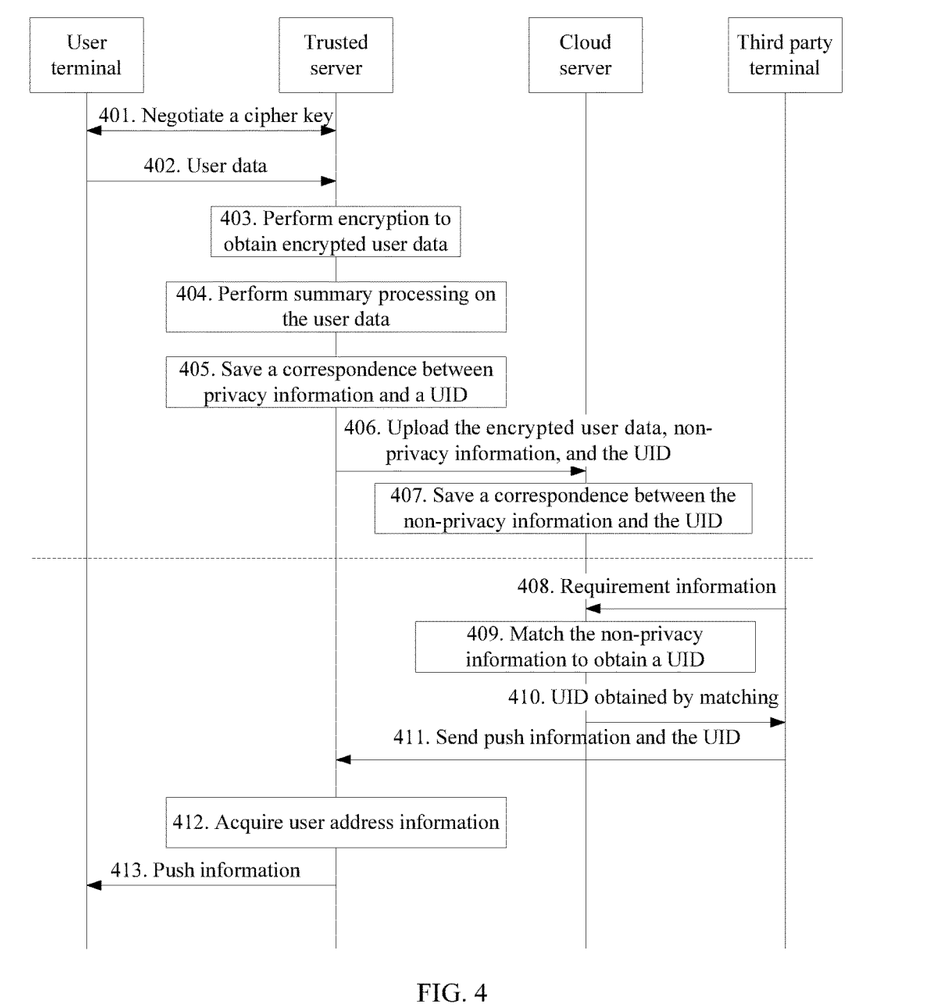
FIG. 4 is a flowchart of another embodiment of an information processing method according to the present disclosure.

Referring to FIG. 4, FIG. 4 is a flowchart of another embodiment of an information processing method according to the present disclosure. In this embodiment, a detailed information processing process is described by using interaction between a user terminal, a trusted server, a cloud server, and a third party terminal.

Step 401: A user terminal and a trusted server performs key agreement, to obtain an encryption key.

One difference between this embodiment and that shown in FIG. 3 lies in that, in this embodiment, the user terminal obtains the encryption key by performing key agreement with the trusted server rather than directly receives a encryption key delivered by the trusted server.

Step 402: The user terminal sends user data to the trusted server.

Step 403: The trusted server encrypts the user data by using the encryption key obtained by the agreement, to obtain encrypted user data.

Step 404: The trusted server performs summary information processing on the user data, extracts summary information from the user data, removes privacy information from the summary information, and generates a UID for the privacy information.

It should be noted that, the foregoing step 404 may also be executed before step 403, which is not limited in the embodiment.

Step 405: The trusted server saves a correspondence between the privacy information and the UID.

Step 406: The trusted server uploads, to a cloud server, a user identity, the encrypted user data, non-privacy information, and the UID generated for the privacy information.

It should be noted that, the trusted server may upload the user identity, the encrypted user data, the non-privacy information, and the UID to the cloud server at the same time, or may upload the non-privacy information and the UID to the cloud server first, and then upload the user identity and the encrypted user data to the cloud server, which is not limited in the embodiment of the present disclosure.

The cloud server is a device used for implementing mass storage of the user data. In order to ensure security of the user data saved on the cloud server, in this embodiment, the user terminal may directly send the user data to the trusted server, and the trusted server encrypts the user data and then uploads encrypted user data to the cloud server for storage; or the user terminal may encrypt the user data and then send encrypted user data to the trusted server, and the trusted server uploads the encrypted user data to the cloud server for storage. Because it is difficult for the third party terminal to obtain the encryption key, the third party terminal cannot access the user data from the cloud server at will.

Step 407: The cloud server saves the user identity, the encrypted user data, and a correspondence between the non-privacy information and the UID.

Step 408: A third party terminal sends requirement information to the cloud server.

Step 409: The cloud server matches the requirement information to saved non-privacy information, to obtain a UID corresponding to non-privacy information that matches the requirement information.

Step 410: The cloud server sends the obtained UID to the third party terminal.

Step 411: The third party terminal sends push information and the UID to the trusted server.

Step 412: The trusted server acquires privacy information corresponding to the UID sent by the third party terminal, and obtains user address information from the privacy information.

Step 413: The trusted server sends the push information to the user terminal according to the obtained address information.

When this embodiment is applied, the third party terminal may be various types of terminals, for example, a terminal of a medical institution, that push advertising information to the user terminal. The third party terminal may access the cloud server; however, because the cloud server saves the non-privacy information and the UID of the privacy information, the third party terminal cannot acquire the privacy information of the user terminal from the cloud server, but can only send the UID and the push information to the trusted server according to the UID, which is returned by the cloud server, of the privacy information. The trusted server obtains the privacy information corresponding to the UID, and then obtains the user address information, so that the trusted server pushes the push information to the user terminal.

Optionally, in the foregoing embodiment shown in FIG. 4, the user terminal may also send, to the trusted server, the encrypted user data that is encrypted by using the encryption key in step 402, and the trusted server may decrypt the encrypted user data by using the encryption key, perform summary processing on the obtained user data, and then send the non-privacy information and the UID of the privacy information that are obtained by summary processing, and the encrypted user data sent by the user terminal to the cloud server; therefore, the trusted server does not need to encrypt the user data, and the encrypted user data is forwarded to the cloud server by the trusted server. Alternatively, the user terminal may also directly transmit the encrypted user data to the cloud server, and the trusted server does not need to forward the encrypted user data. The user terminal may send the user data or the encrypted user data to the trusted server, and the trusted server performs summary processing on the user data, and then uploads the non-privacy information and the UID of the privacy information that are obtained by summary processing to the cloud server, which is not limited in the embodiment of the present disclosure.

It can be seen from the foregoing embodiment that, after summary information of a user is processed by a trusted server, a cloud server no longer saves complete summary information formed by privacy information and non-privacy information, but saves only the non-privacy information in the summary information and a UID of the privacy information in the summary information, so that a third party cannot acquire the privacy information of the user from the cloud server, thereby improving security performance of a cloud computing system.

Corresponding to the embodiments of information processing methods of the present disclosure, the present disclosure further provides embodiments of a trusted server and a cloud server.

Figure 5:
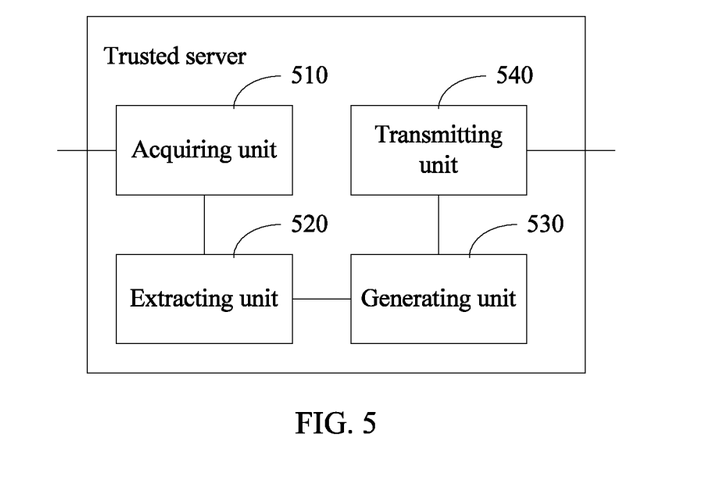
FIG. 5 is a block diagram of an embodiment of a trusted server according to the present disclosure.

Referring to FIG. 5, FIG. 5 is a block diagram of an embodiment of a trusted server according to the present disclosure.

The trusted server includes: an acquiring unit 510, an extracting unit 520, a generating unit 530, and a transmitting unit 540.

The acquiring unit 510 is configured to acquire user data of a user terminal.

The extracting unit 520 is configured to extract summary information of the user data acquired by the acquiring unit 510, where the summary information includes privacy information and non-privacy information of a user.

The generating unit 530 is configured to generate a UID for the privacy information in the summary information extracted by the extracting unit 520.

The transmitting unit 540 is configured to transmit, to a cloud server, the non-privacy information in the summary information extracted by the extracting unit 520 and the UID generated by the generating unit 530, so that the cloud server saves a correspondence between the non-privacy information and the UID.

In this embodiment of the present disclosure, the trusted server may be a server in a trust center. The trust center is deployed between a cloud server and a terminal, and may issue certificates in advance to the cloud server, the user terminal, and a third party terminal that perform information interaction by using the trusted server, so as to implement identity authentication between the cloud server, the user terminal, and the third party terminal, that is, the trust center may have a certificate authority center. In addition, the trust center may further deliver a key to the user terminal, that is, the trust center may have a key distribution center.

Figure 6:
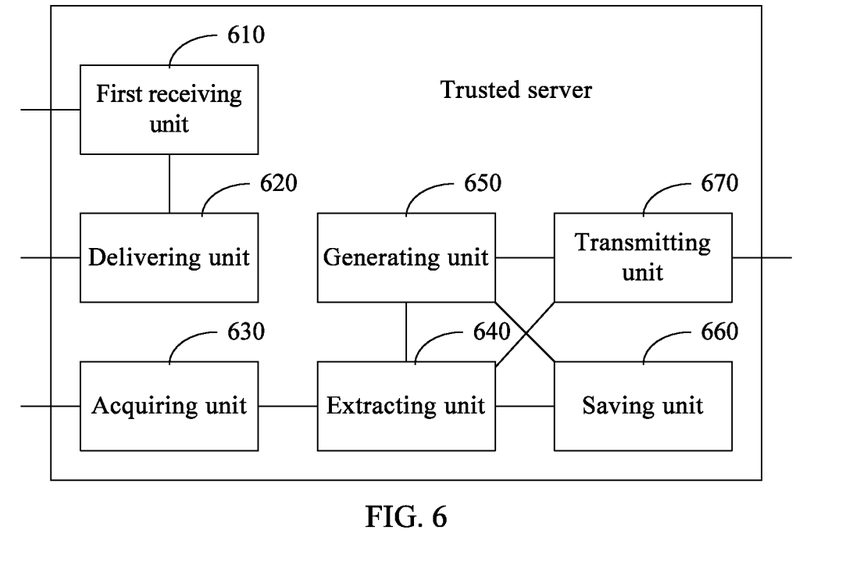
FIG. 6 is a block diagram of another embodiment of a trusted server according to the present disclosure.

Referring to FIG. 6, FIG. 6 is a block diagram of another embodiment of a trusted server according to the present disclosure.

The trusted server includes: a first receiving unit 610, a delivering unit 620, an acquiring unit 630, an extracting unit 640, a generating unit 650, a saving unit 660, and a transmitting unit 670.

The first receiving unit 610 is configured to receive a key request message sent by a user terminal.

The delivering unit 620 configured to deliver an encryption key to the user terminal according to the key request message received by the first receiving unit 610, so that the user terminal encrypts user data according to the encryption key and then transmits encrypted user data to a cloud server.

The acquiring unit 630 is configured to acquire the user data of the user terminal, the acquiring unit 630 may include (not shown in FIG. 6): a notification message receiving sub-unit configured to receive a notification message sent by the user terminal, where the notification message is used to notify the trusted server that the encrypted user data has been uploaded to the cloud server by the user terminal, and the encrypted user data is data obtained by the user terminal after encrypting the user data according to the encryption key delivered by the trusted server; a data request sending sub-unit configured to send, to the cloud server according to the notification message received by the notification message receiving sub-unit, a data request message that is used to request for the encrypted user data; an encrypted data receiving sub-unit configured to receive the encrypted user data that is returned by the cloud server according to the data request message sent by the request message sending sub-unit; and an encrypted data decrypting sub-unit configured to decrypt, by using the encryption key, the encrypted user data received by the encrypted data receiving sub-unit, to obtain decrypted user data.

The extracting unit 640 is configured to extract summary information of the user data acquired by the acquiring unit 630, where the summary information includes privacy information and non-privacy information of a user.

The generating unit 650 is configured to generate a UID for the privacy information in the summary information extracted by the extracting unit 640.

The saving unit 660 is configured to save a correspondence between the privacy information in the summary information extracted by the extracting unit 640 and the UID generated by the generating unit 650.

The transmitting unit 670 is configured to transmit, to the cloud server, the non-privacy information in the summary information extracted by the extracting unit 640 and the UID generated by the generating unit 650, so that the cloud server saves a correspondence between the non-privacy information and the UID.

Figure 7:
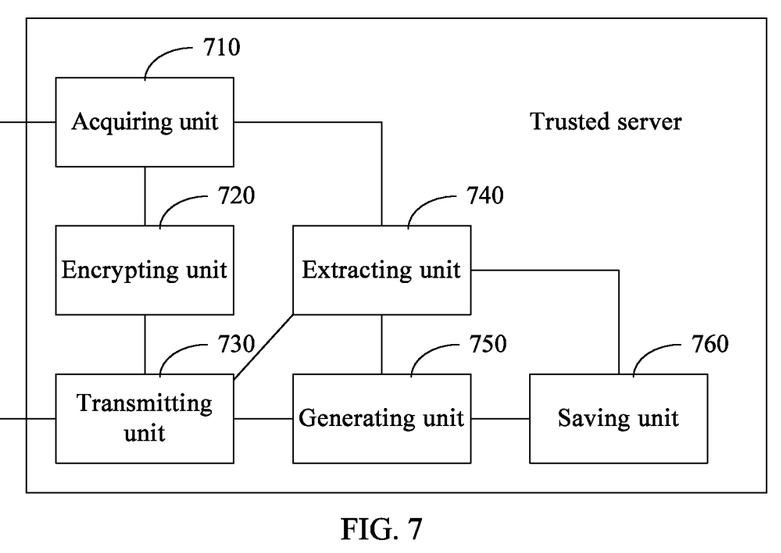
FIG. 7 is a block diagram of another embodiment of a trusted server according to the present disclosure.

Referring to FIG. 7, FIG. 7 is a block diagram of another embodiment of a trusted server according to the present disclosure.

The trusted server includes: an acquiring unit 710, an encrypting unit 720, a transmitting unit 730, an extracting unit 740, a generating unit 750, and a saving unit 760.

The acquiring unit 710 is configured to acquire user data of a user terminal, the acquiring unit 710 may include (not shown in FIG. 7): a user data receiving sub-unit configured to receive the user data, which is uploaded by the user terminal, of the user terminal.

The encrypting unit 720 is configured to encrypt, by using an encryption key agreed with the user terminal, the user data acquired by the acquiring unit 710.

The transmitting unit 730 is configured to transmit, to a cloud server, encrypted user data that is output by the encrypting unit 720.

The extracting unit 740 is configured to extract summary information of the user data acquired by the acquiring unit 710, where the summary information includes privacy information and non-privacy information of a user.

The generating unit 750 is configured to generate a UID for the privacy information in the summary information extracted by the extracting unit 740.

The transmitting unit 730 is further configured to transmit, to the cloud server, the non-privacy information in the summary information extracted by the extracting unit 740 and the UID generated by the generating unit 750, so that the cloud server saves a correspondence between the non-privacy information and the UID.

The saving unit 760 is configured to save a correspondence between the privacy information in the summary information extracted by the extracting unit 740 and the UID generated by the generating unit 750.

Figure 8:
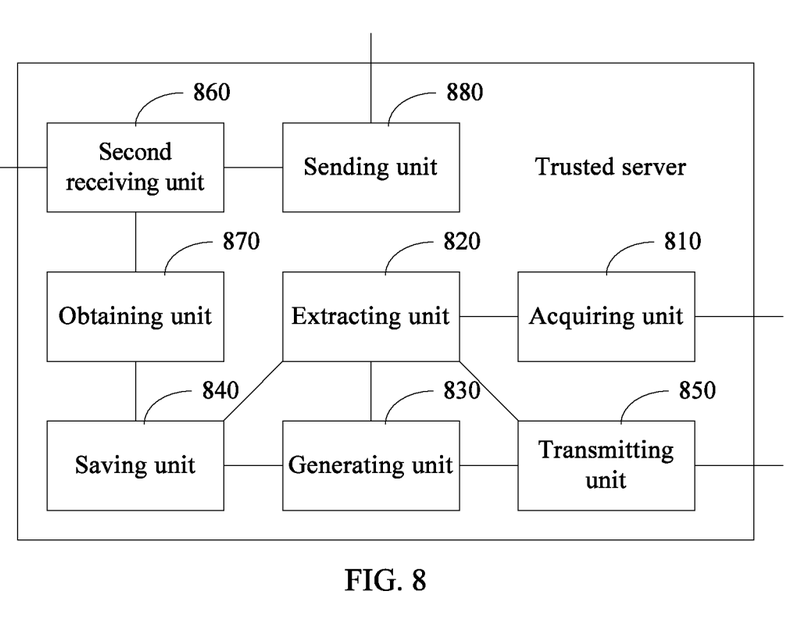
FIG. 8 is a block diagram of another embodiment of a trusted server according to the present disclosure.

Referring to FIG. 8, FIG. 8 is a block diagram of another embodiment of a trusted server according to the present disclosure.

The trusted server includes: an acquiring unit 810, an extracting unit 820, a generating unit 830, a saving unit 840, a transmitting unit 850, a second receiving unit 860, an obtaining unit 870, and a sending unit 880.

The acquiring unit 810 is configured to acquire user data of a user terminal.

The extracting unit 820 is configured to extract summary information of the user data acquired by the acquiring unit 810, where the summary information includes privacy information and non-privacy information of a user.

The generating unit 830 is configured to generate a UID for the privacy information in the summary information extracted by the extracting unit 820.

The saving unit 840 is configured to save a correspondence between the privacy information in the summary information extracted by the extracting unit 820 and the UID generated by the generating unit 830.

The transmitting unit 850 is configured to transmit, to a cloud server, the non-privacy information in the summary information extracted by the extracting unit 820 and the UID generated by the generating unit 830, so that the cloud server saves a correspondence between the non-privacy information and the UID.

The second receiving unit 860 is configured to receive push information and a UID that are sent by a third party terminal, where the UID is a UID that is obtained and sent to the third party terminal by the cloud server after receiving requirement information sent by the third party terminal, and that is corresponding to non-privacy information matching the requirement information.

The obtaining unit 870 is configured to obtain, from the correspondence, which is saved by the saving unit 840, between the privacy information and the UID, privacy information corresponding to the UID received by the second receiving unit 860.

The sending unit 880 is configured to send the push information according to user address information included in the privacy information acquired by the obtaining unit 870.

Figure 9:
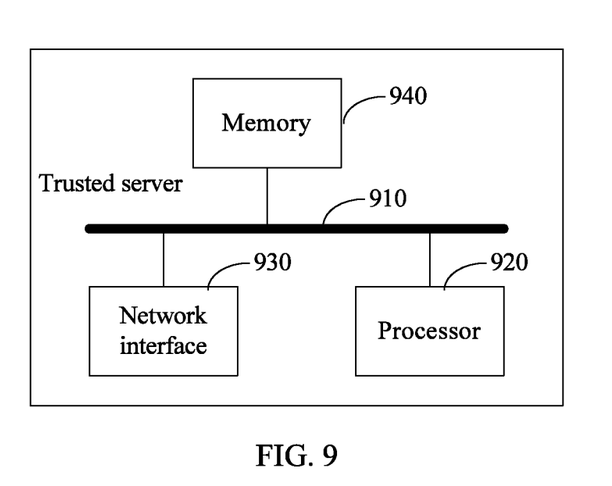
FIG. 9 is a block diagram of another embodiment of a trusted server according to the present disclosure.

Referring to FIG. 9, FIG. 9 is a block diagram of another embodiment of a trusted server according to the present disclosure.

The trusted server includes: a bus 910, a processor 920, a network interface 930, and a memory 940.

The processor 920 is configured to acquire user data of a user terminal by using the network interface 930, extract summary information of the user data, where the summary information includes privacy information and non-privacy information of a user, generate a UID for the privacy information, and transmit the non-privacy information and the UID to a cloud server by using the network interface 930, so that the cloud server saves a correspondence between the non-privacy information and the UID.

The memory 940 is configured to save a correspondence between the privacy information and the UID.

Optionally, the processor 920 may be further configured to receive, by using the network interface 930, push information and a UID that are sent by a third party terminal, where the UID is a UID that is obtained and sent to the third party terminal by the cloud server after receiving requirement information sent by the third party terminal, and that is corresponding to non-privacy information matching the requirement information; obtain privacy information corresponding to the UID; and send the push information to the user by using the network interface 930 according to user address information included in the privacy information.

Figure 10:
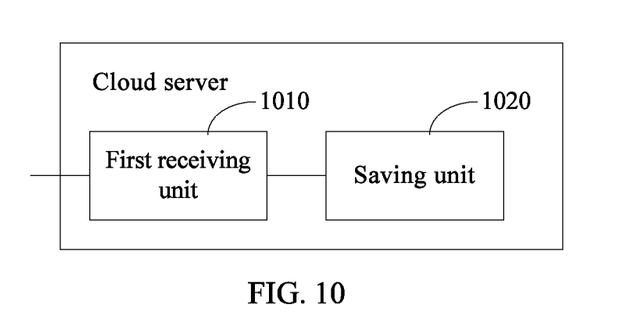
FIG. 10 is a block diagram of an embodiment of a cloud server according to the present disclosure.

Referring to FIG. 10, FIG. 10 is a block diagram of an embodiment of a cloud server according to the present disclosure.

The cloud server includes: a first receiving unit 1010 and a saving unit 1020.

The first receiving unit 1010 is configured to receive non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server.

The saving unit 1020 is configured to save a correspondence between the non-privacy information and the UID that are received by the first receiving unit 1010.

Figure 11:
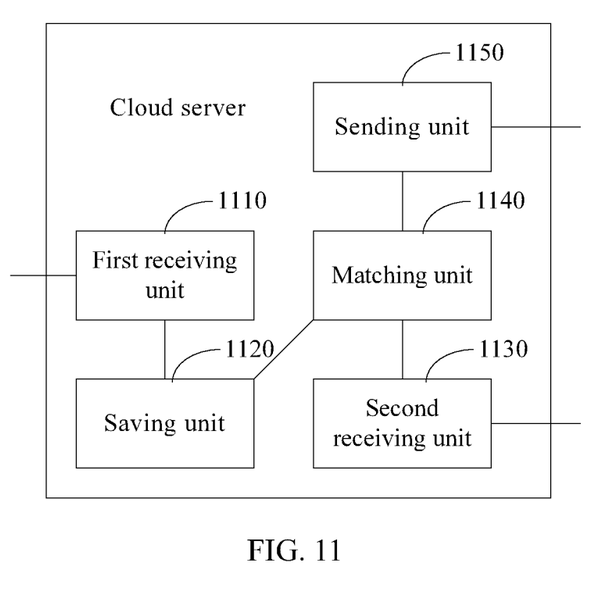
FIG. 11 is a block diagram of another embodiment of a cloud server according to the present disclosure.

Referring to FIG. 11, FIG. 11 is a block diagram of another embodiment of a cloud server according to the present disclosure.

The cloud server includes: a first receiving unit 1110, a saving unit 1120, a second receiving unit 1130, a matching unit 1140, and a sending unit 1150.

The first receiving unit 1110 is configured to receive non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server.

The saving unit 1120 is configured to save a correspondence between the non-privacy information and the UID that are received by the first receiving unit 1110.

The second receiving unit 1130 is configured to receive requirement information sent by a third party terminal.

The matching unit 1140 is configured to match the non-privacy information saved by the saving unit 1120 to the requirement information received by the second receiving unit 1130, to obtain a UID corresponding to non-privacy information that matches the requirement information.

The sending unit 1150 is configured to send, to the third party terminal, the UID that is corresponding to the non-privacy information and obtained by the matching unit 1140, so that, after the third party terminal sends the UID and push information to the trusted server, the trusted server sends the push information according to user address information included in privacy information corresponding to the UID.

Figure 12:
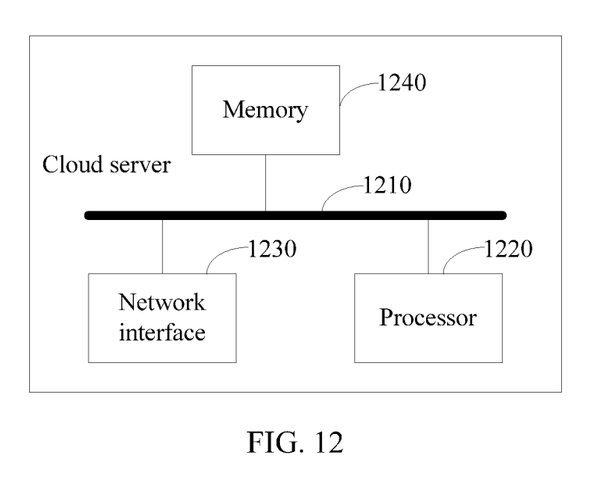
FIG. 12 is a block diagram of another embodiment of a cloud server according to the present disclosure.

Referring to FIG. 12, FIG. 12 is a block diagram of another embodiment of a cloud server according to the present disclosure.

The cloud server includes: a bus 1210, a processor 1220, a network interface 1230, and a memory 1240, where the processor 1220, the network interface 1230, and the memory 1240 are connected by using the bus 1210.

The processor 1220 is configured to receive, by using the network interface 1230, non-privacy information and a UID of a user that are transmitted by a trusted server, where the non-privacy information is information included in summary information that is extracted by the trusted server from acquired user data, the summary information further includes privacy information of the user, and the UID is a UID that is generated for the privacy information by the trusted server; and save a correspondence between the non-privacy information and the UID to the memory 1240.

Optionally, the processor 1220 may be further configured to receive, by using the network interface 1230, requirement information sent by a third party terminal, match the non-privacy information saved by the memory 1240 to the requirement information, to obtain a UID corresponding to non-privacy information that matches the requirement information, and send the obtained UID corresponding to the non-privacy information to the third party terminal by using the network interface 1230, so that, after the third party terminal sends the UID and push information to the trusted server, the trusted server sends the push information according to user address information included in privacy information corresponding to the UID.

It can be seen from the foregoing embodiment that, a trusted server acquires user data of a user terminal, extracts summary information of the user data, where the summary information includes privacy information and non-privacy information of a user, generates a UID for the privacy information, and transmits the non-privacy information and the UID to a cloud server, and the cloud server saves a correspondence between the non-privacy information and the UID. Because a trusted server is introduced in the embodiments of the present disclosure, after the summary information of the user is processed by the trusted server, the cloud server no longer saves complete summary information formed by the privacy information and the non-privacy information, but saves only the non-privacy information in the summary information and the UID of the privacy information in the summary information, so that a third party cannot acquire the privacy information of the user from the cloud server, thereby improving security performance of a cloud computing system.

A person skilled in the art may clearly understand that the technique in the embodiments of the present disclosure may be implemented through software and a necessary general hardware platform. Based on such an understanding, the technical solutions of the present disclosure essentially or the part contributing to the prior art may be implemented in a form of a software product. The computer software product is stored in a storage medium, such as a read-only memory/random access memory (ROM/RAM), a hard disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A system, comprising:
a cloud server comprising a memory; and
a trusted server in communication with the cloud server, the trusted server comprising:
a processor; and
a memory coupled to the processor and configured to store executable program code, the processor being configured to execute the executable program code to:
receive a key request message including a user identity from a user terminal;
return an encryption key to the user terminal such that the user terminal uploads encrypted user data to the cloud server, the encrypted user data being encrypted using the encryption key;
receive a notification message from the user terminal indicating that the encrypted user data has been uploaded to the cloud server;
send a data request message including the user identity to the cloud server to request for the encrypted user data;
receive the encrypted user data from the cloud server;
decrypt the encrypted user data using the encryption key to obtain user data;
extract summary information of the user data, the summary information comprising privacy information and non-privacy information of a user;
generate a unique identifier (UID) for the privacy information; and
transmit the non-privacy information and the UID to the cloud server;
the cloud server being configured to:
save the non-privacy information, the UID, and a correspondence between the non-privacy information and the UID;
receive requirement information from a third party terminal; and
send the UID to the third party terminal when the non-privacy information matches the requirement information; and
the trusted server being further configured to:
save a correspondence between the privacy information and the UID;
receive push information and the UID from the third party terminal;
obtain the privacy information corresponding to the UID; and
send the push information to the user terminal according to user address information comprised in the privacy information.

2. The system of claim 1, wherein the trusted server is deployed between the cloud server and the user terminal.

3. The system of claim 1, wherein the trusted server is configured with a certificate authority (CA) center configured to implement identity authentication between the cloud server, the user terminal, and the third party terminal.

* * * * *

UNITED STATES PATENT AND TRADEMARK OFFICE
CERTIFICATE OF CORRECTION

PATENT NO. : 10,063,655 B2  
APPLICATION NO. : 14/820673  
DATED : August 28, 2018  
INVENTOR(S) : Chan Wang and Huangwei Wu Page 1 of 1

It is certified that error appears in the above-identified patent and that said Letters Patent is hereby corrected as shown below:

On the Title Page

Item (30), Line 1: "201310092589" should read "201310092589.8"

Page (2), Item (56), OTHER PUBLICATIONS, Line 5: "Form" should read "From"

Signed and Sealed this  
Fourth Day of December, 2018

Andrei Iancu  
*Director of the United States Patent and Trademark Office*